Patented Nov. 16, 1926.

1,607,293

UNITED STATES PATENT OFFICE.

CHARLES MOUREU AND CHARLES DUFRAISSE, OF PARIS, FRANCE.

CONDENSATION PRODUCT OF ACROLEIN AND PROCESS OF PRODUCING THE SAME.

No Drawing. Continuation of application Serial No. 433,664, filed December 28, 1920. This application filed March 29, 1922, Serial No. 547,919, and in France March 31, 1919.

(GRANTED UNDER THE PROVISIONS OF THE ACT OF MARCH 3, 1921, 41 STAT. L., 1313.)

Patents containing the disclosure corresponding to the present application have been obtained as follows: France, March, 1919; Belgium, March 2, 1920; Italy, May 7, 1920; England, March 31, 1920; and Germany, March 18, 1920.

This invention relates to a process of preparing a resin from acrolein which can be employed as a hard and insulating varnish or for the manufacture of various objects, the present application being a continuation of our earlier application bearing Ser. No. 433,664, filed December 28, 1920.

The preparation is made by direct condensation of substantially anhydrous acrolein in a single stage with a suitable phenol in presence of a trace of a suitable reagent, for instance a mineral or organic base either free or combined.

The present invention differs from that described in our copending application Serial No. 433,664, filed December 28, 1920, in which acrolein itself is condensed by traces of resinifying agents such as alkaline carbonates, salts of heavy metals, ammonia, methylamine, aniline, ferric chlorid, and acetate of lead yielding resins. Proceeding according to the disclosure in our copending application, it is sufficient to dissolve the acrolein in water and to add the resinifying reagent in order to obtain a voluminous white precipitate which, when washed and dried in vacuo, forms an impalpable white powder insoluble in water and hydrocarbons, but very soluble even in the cold in the majority of other organic solvents and particularly in alcohols, ketones and acids.

This product agglomerates and melts forming a viscous mass at a variable temperature depending on the conditions of preparation, but usually between 80 and 110° C. Its other physical properties also depend upon the conditions of preparation.

On evaporating the solvent, solutions of this product leave a very brilliant and perfectly limpid varnish which can be employed in any suitable manner for the usual purposes for which products of this kind are employed in simple or multiple layers by coating or dipping for example on surfaces of all kinds such as metal, wood, celluloid, and for various purposes such as insulation or protection against corrosion and so on.

It has been proposed to manufacture synthetic resins by treating various aldehydes with phenols, including acrolein with cresol, in three stages with separation of water and employing a substantial quantity of catalyst, e. g. approximately 6% with separation of the remainder of the catalyst in the third stage of the reaction. In the first stage the aldehyde and phenol are digested with a substantial quantity of an ammonium salt so as to form two liquid layers. In the second stage the condensation product is separated and allowed to stand till more water separates out. In the third stage the product is heated to expel all traces of water and the catalytic agent.

The reaction according to the present invention is extraordinarily simple since the acrolein and the phenol are simply mixed with a small quantity of the condensing agent when the reaction takes place so as to give a 100% yield.

*Example.*

10 parts of commercial phenol and 90 parts of anhydrous acrolein are treated with 1 part of caustic soda. A reaction takes place spontaneously at ordinary temperatures but can be accelerated by heating, not above 100° C. The reaction is complete, with 100% yield when the mass has reached the desired consistency.

In the process according to the present invention, the proportions of acrolein and phenol can vary within very wide limits, e. g. from 90% as in the above example acrolein to 20% acrolein and even less.

Instead of using acrolein itself as raw material, a suitable resin or polymerization product thereof may be employed. In this case it is necessary to warm the mixture in order to prepare the condensation products with phenol.

On the other hand however it is also possible to dissolve the acrolein resins and the phenol in a suitable solvent which is then allowed to evaporate, or the two substances are melted together at a temperature near 100° C. It is also possible to employ a solution of acrolein resins in acrolein itself.

Obviously phenol itself can be replaced by any other suitable body containing a phenolic group, e. g. simple phenols such as cresol, or naphthols, or polyhydroxy bodies such as guaiacol or eugenol.

The resins obtained according to the present invention are hard, cannot be scratched with the finger nail, and are susceptible of a fine polish. They are insoluble in most solvents; they are bad conductors of electricity and can be employed for any suitable purpose, e. g. by moulding, impregnation, or they can be worked up in the piece.

We claim:—

1. A condensation product resulting from the reaction of a phenolic body and acrolein, consisting of a dense, homogeneous solid infusible at all temperatures and insoluble in alcohol, acetone, benzol and other ordinary organic solvents.

2. A condensation product resulting from the reaction of phenol and acrolein consisting of a resinous material.

3. An initial condensation product resulting from the reaction of a phenolic body and acrolein and consisting of a liquid soluble in alcohol, acetone and benzol and capable of being further condensed and solidified by heating.

4. The method which consists in causing a phenolic body and acrolein to react to form an initial condensation product capable of being further condensed and solidified by heating.

5. A process of obtaining an insoluble hard and non-conducting resin which consists in condensing acrolein with phenols directly in the presence of a trace of a catalytic or condensing agent.

Signed at Paris, France, this 10th day of February, 1922.

CHARLES MOUREU.
CHARLES DUFRAISSE.